United States Patent [19]
Shinjo

[11] Patent Number: 5,743,003
[45] Date of Patent: Apr. 28, 1998

[54] APPARATUS FOR INTERMITTENT FEED AND AUTOMATIC FIXING OF THE SELF PIERCING NUTS

[75] Inventor: Hiroshi Shinjo, Osaka, Japan

[73] Assignee: Yugenkaisha Shinjo Seisakusho, Osaka, Japan

[*] Notice: The term of this patent shall not extend beyond the expiration date of Pat. No. 5,522,129.

[21] Appl. No.: 663,943

[22] Filed: Jun. 14, 1996

[30] Foreign Application Priority Data

Jun. 21, 1995 [JP] Japan .................. 7-179341

[51] Int. Cl.⁶ .................................. B23P 19/06
[52] U.S. Cl. .................................. 29/798; 29/818
[58] Field of Search .................. 221/64, 151; 29/798, 29/809, 818

[56] References Cited

U.S. PATENT DOCUMENTS

| | | | |
|---|---|---|---|
| 3,108,368 | 10/1963 | Stewart | 29/798 X |
| 3,452,418 | 7/1969 | Ernest et al. | 29/818 |
| 3,946,478 | 3/1976 | Goodsmith et al. | 29/798 |
| 4,027,370 | 6/1977 | Bachar | 29/818 |
| 4,153,989 | 5/1979 | Shinjo | 29/818 X |
| 4,164,072 | 8/1979 | Shinjo | 29/818 X |
| 4,242,793 | 1/1981 | Matthews | 29/798 |
| 4,505,416 | 3/1985 | Smallegan | 29/818 X |
| 4,785,529 | 11/1988 | Pamer et al. | 29/818 X |
| 5,522,129 | 6/1996 | Shinjo | 29/818 X |

*Primary Examiner*—Daniel Moon
*Attorney, Agent, or Firm*—Antonelli, Terry, Stout, & Kraus, LLP

[57] ABSTRACT

An apparatus for automatically fixing the self-piercing nuts has a striking punch (2) for causing the end face of each nut (N) to pierce a metallic panel (P) laid on a caulking die (1) and to be fixed to the panel, and also has a mechanism for intermittently feeding the nuts. The mechanism is composed of a rigid frame (6) to which a slide guide (3) is fixed and a movable chute (8) having a distal opening (8a) communicating with a feeding aperture (5) opened in the slide guide and a proximal opening (8b) communicating with a flexible chute (7). The movable chute (8) held in and connected to the rigid frame (6) is driven by an actuator (22) mounted on the frame so as to swing between an operative and inoperative positions. The distal opening (8a) of the movable chute (8) is partially closed with a side face of the striking punch (2) or of the slide guide (3) every time when the movable chute swings to its inoperative position, so that the apparatus as a whole is made lighter, smaller and easier to remote control.

2 Claims, 4 Drawing Sheets

APPARATUS FOR INTERMITTENT FEED AND AUTOMATIC FIXING OF THE SELF PIERCING NUTS

BACKGROUND OF THE INVENTION

1. Field of the Invention

The present invention relates to an apparatus for intermittent feed and automatic fixing of the self-piercing nuts (hereinafter simply referred to as 'nuts') onto a metallic panel, wherein each nut is caused to act as a pressing punch which itself can bite the panel lying on a caulking die so as to become integral with the panel.

2. Prior Art

The prior art apparatuses for automatically fixing the nuts are usually incorporated in various presses together with press molds. It is often required to halt the feed of nuts in relation to the operation or condition of those press molds, when some of such apparatuses have to be made inoperative or when some of the molds are replaced with other ones or are adjusted as to their position in the press.

In view of such a demand, the present applicant has already proposed a device by which the feeding of nuts can be temporarily stopped in the automatically fixing apparatus remaining in the mold (see Japanese Utility Model Publications No. 55-55934 and No. 60-182264).

This device for temporary stopping the nut feeding is constructed such that a striking punch is held by a supporter and mounted on a press ram. A slide guide (or a nut holding block) has a vertical bore in which the punch slides up and down, in addition to a transverse feed path having a delivery aperture and formed perpendicular to the vertical bore. The slide guide is driven to move vertically along guide posts, relative to the supporter and between an upper limit and a lower limit. The device further comprises spring means urging downwards both the slide guide and the guide posts, and the upper limit is adjustable such that a side face of the striking punch closes the delivery aperture.

It is however necessary to employ outside the mold a remote controller of a complicated structure for altering the upper limit of the slide guide. A flexible chute for successively feeding the nuts is connected to the slide guide is always filled with the nuts, thereby rendering the assembly so heavy that this system can not necessarily be highly durable if the nut feeding is intermitted for every stroke of the press ram.

SUMMARY OF THE INVENTION

An object of the present invention is therefore to resolve those problems inherent in the prior art apparatuses, and more particularly to provide a novel apparatus characterized in that a mechanism for temporary stopping the nut feeding is capable of being remote controlled easily and surely and is formed integral with the slide guide such that the apparatus as whole is lighter in weight and smaller in size.

The apparatus proposed herein to attain this object and designed for the intermittent feed and automatic fixing of the self-piercing nuts onto a metallic panel as a workpiece does comprise a caulking die for supporting the metallic panel, a striking punch connected by a connecting member to a press ram so as to face the caulking die, a slide guide having a vertical bore and a nut feeding aperture extending perpendicular thereto, the striking punch being capable of sliding up and down through the vertical bore, a flexible chute connected to the slide guide and communicating with the nut feeding aperture, and a supporting device for holding and allowing the slide guide to slide up and down a vertical distance relative to the connecting member, the supporting device biasing the slide guide downwardly by a spring means such that the self-piercing nut having entered the vertical bore through the feeding aperture is struck by the punch so as to bite or punch and be secured to the metallic panel. Further, the apparatus characteristically comprises a rigid frame to which the slide guide is fixed, a movable chute having a distal opening communicating with the feeding aperture and a proximal opening communicating with the flexible chute, the movable chute being held in and connected to the rigid frame, and an actuator mounted on the rigid frame so as to drive the movable chute to swing between an operative and inoperative positions thereof relative to the slide guide, whereby the distal opening of the movable chute is partially closed with a side face of the striking punch or of the slide guide, every time when the movable chute swings to its inoperative position.

In operation of the apparatus, the nuts will successively be supplied in a row through the flexible chute and into the movable chute. The leading one of those nuts will transfer into the vertical bore of the slide guide, through the distal opening and the feeding aperture while the movable chute is at its operative position. However, such a feeding of nuts into the vertical bore will be intermitted in consequence of the swing of said movable chute towards its inoperative position, as noted above. Desirably, the movable chute is driven to swing in harmony with vertical reciprocation of the press ram driving the striking punch, so that the nuts successively fed one by one into the vertical bore are protected from jamming therein. In other words, only one nut will be present within the bore at any moment.

BRIEF DESCRIPTION OF THE DRAWINGS

FIGS. 3(a) to 3(c) show a striking punch incorporated in the apparatus, in which;

FIG. 3(a) is a left side elevation of the punch;

FIG. 3(b) is similarly a right side elevation of the punch; and

FIG. 3(c) is a bottom view of the punch;

DETAILED DESCRIPTION OF THE PREFERRED EMBODIMENTS

Figure 1:
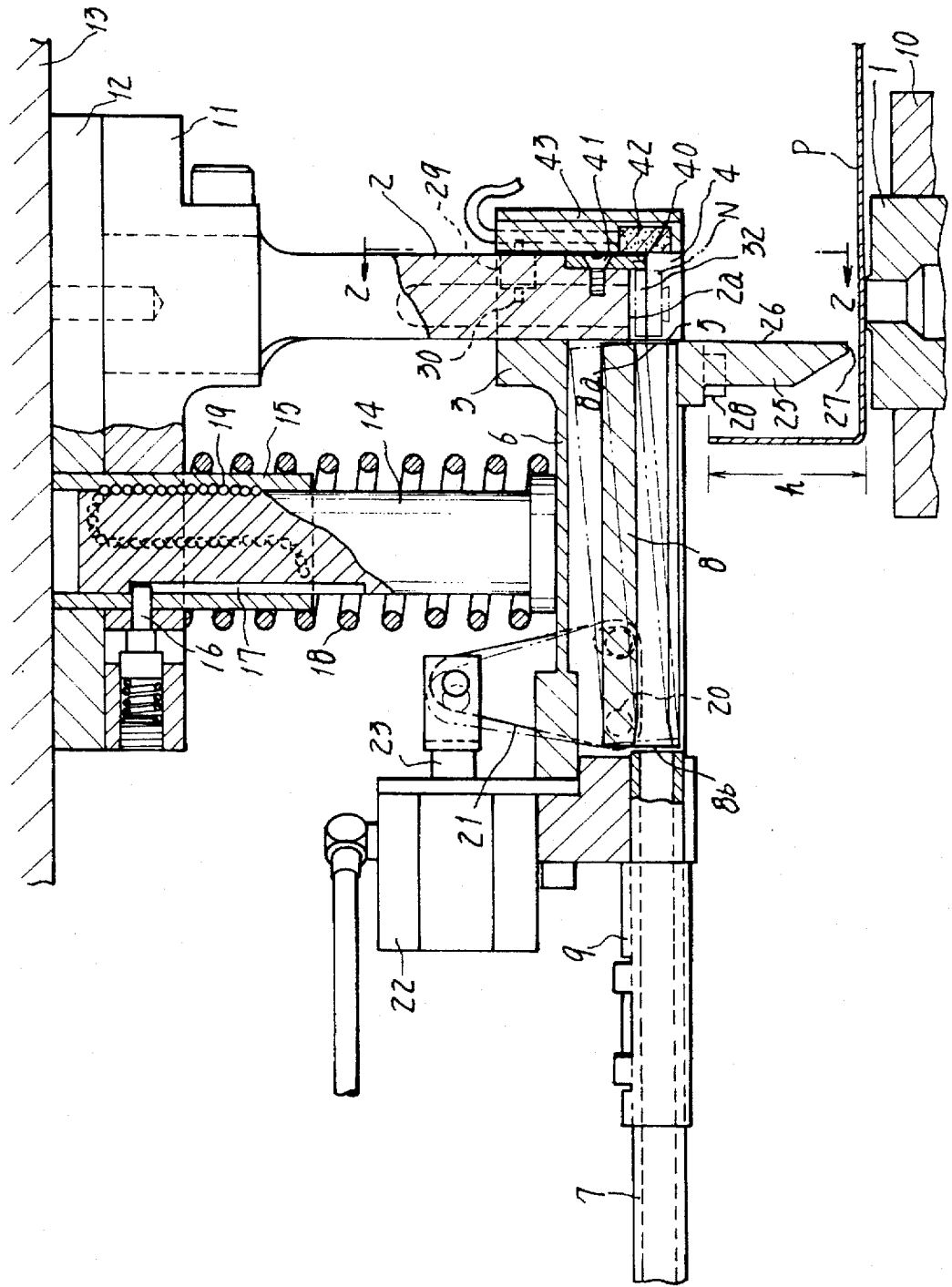
FIG. 1 is a front elevation of an apparatus for fixing the self-piercing nut, the apparatus being provided by the invention and shown partly in cross section.

Now, some embodiments of the present invention will be described referring to the drawings.

FIG. 1 illustrates an apparatus provided herein for automatically fixing the so-called self-piercing nuts to a metallic panel 'P'. This apparatus cooperates with a caulking die 1 on which the panel 'P' is laid, and comprises a striking punch 2 capable of being disposed to face the caulking die 1. A slide guide 3 has a vertical bore 4 formed therethrough and a nut feeding aperture 5 extending perpendicular to the bore, wherein the striking punch 2 slidably reciprocates up and down through the bore 4. Formed integral with the slide guide 3 is a rigid frame 6 arch-shaped in cross section. A distal end of the rigid frame 6 communicates with the nut feeding aperture 5, with a proximal end of said frame being connected by a fitting 9 to a flexible chute 7. A movable chute 8 is accommodated in the rigid frame 6 so that a series of the self-piercing nuts (hereinafter simply referred to as 'nuts') 'N' are transferred one by one from the flexible chute 7 to the vertical bore 4, through a distal opening 8a of the movable chute and the aperture 5.

A die holder 10 carrying the caulking die 1 is fixed to a bolster (not shown) of a pressing machine, together with other lower dies. A punch holder (as the connecting member) 11 to which the striking punch 2 is secured is attached to a back-up plate 12, which in turn is fixed to a press ram 13, together with other upper dies (not shown). The striking punch can thus reciprocate up and down accompanying the press ram 13.

The slide guide 3 fits on the striking punch 2 so that the latter is received through the vertical bore 4 of said guide. On the other hand, a guide post 14 integral with the rigid frame 3 stands upright in parallel with said punch 2. A guide sleeve 15 integral with the punch holder 11 fits on and allows the guide post 14 to slide up and down. Therefore, the slide guide 3 and the rigid frame 6 are movable vertically relative to the striking punch 2. A pin 16 attached to the punch holder 11 engages with an axial groove 17 formed in a side wall surface of the guide post 14, thereby defining an upper and lower limits for reciprocation of the guide post. A coiled spring 18 loosely fitting on the guide post 14 and the guide sleeve 15 urges downwards the slide guide 3 together with the rigid frame 6, so as to cause them to take a lowermost position shown in FIG. 1. A number of small rolling members (viz. balls) 19 circulate through a narrow gap present between the guide post 14 and the guide sleeve 15, thus forming the so-called 'ball-spline'. Such a bearing structure ensures a smooth vertical reciprocation of the guide post 14, in spite of a possible twisting and/or bending stress to a certain degree is imparted thereto.

The proximal end of the movable chute 8 is pivoted by a pin 20 to the rigid frame 6. The movable chute 8 thus held in the rigid frame has a proximal opening 8b communicating with the flexible chute 7, in addition to the distal opening 8a communicating with the nut feeding aperture 5. A bracket 21 is connected at its bottom to opposite ends of the pin 20, and at its top connected to a rod 23 of a pneumatic cylinder 22. This cylinder drives the movable chute 8 to swing about the pin 20 so that the distal opening 8a of the movable chute is displaced a little vertical distance. With the movable chute 8 being held at a horizontal position shown with the solid lines in FIG. 1, the nuts 'N' transferred from the flexible chute 7 will be delivered to the vertical bore 4, through the opening 8a and the nut feeding aperture 5. On the other hand, when the opening 8a is raised to take its upper position indicated by the phantom lines in FIG. 1, said opening 8a will be closed in part by a proximal wall surface of the striking punch 2, thereby interrupting the feeding of nuts. Such a vertical displacement of the movable chute 8 driven by the pneumatic cylinder 22 will repeat in response to the vertical reciprocation of the press ram 13, so that the nuts 'N' is supplied one by one to the vertical bore 4 in the slide guide 3. It is possible that some apparatuses each of the described structure are mounted on the same pressing machine, and one or more of them temporarily rest inoperative. Some or all of those apparatuses may also be kept inoperative when the work to change the dies or to align them with the cooperative dies is carried out. In those occasions, the cylinder 22 may be operated solely and independently of the vertically reciprocating press ram 13, such that the distal opening 8a of the movable chute 8 is maintained at it upper position to temporarily stop the feeding of the nuts 'N'.

Although the distal end of movable chute 8 swings vertically, it may be modified to swing sideways between the operative and inoperative positions. Also in this case, the side face of slide guide 3 will partially close the distal opening 8a when said distal end is at the inoperative position.

A workpiece butting leg member 25 fixed to a bottom of the slide guide 3 protrude downward therefrom in parallel with the vertical bore 4. The leg member 25 has a flat distal side 26 of approximately the same width as the striking punch 2 (see FIG. 2). The distal side 26 extends in a plane in which the aperture 5 and the proximal wall surface of the bore 4 lie, so that the nut 'N' gripped by the punch 2 penetrating the bore through the slide guide 3 is guided until rigidly fixed on the metal panel 'P'. A proximal side of the leg member has an obliquely cut lower portion to provide a narrow bottom 27. The height of the leg member 25 corresponds to the height 'h' of an L-shaped bent portion of the panel (viz. workpiece). Set screws 28 detachably attach this workpiece butting member 25 so that it can be replaced with another one to match any change in the height of said bent portion.

However, the striking punch 2 inserted in the bore 4 of slide guide 3 is of a sufficient length such that the punch moving down along the leg member can reach the narrow bottom 27 thereof to strike and fix the nut 'N' onto the panel. Disposed near an upper opening of the vertical bore 4 are a pair of rollers 29 each rotatable around a horizontal shaft 30 integral with the slide guide 3 (see FIG. 2). Opposite sides of the striking punch 2 are in a rolling contact with those rollers 30, whereby the slide guide can easily and smoothly move up and down relative to said punch.

Figure 2:
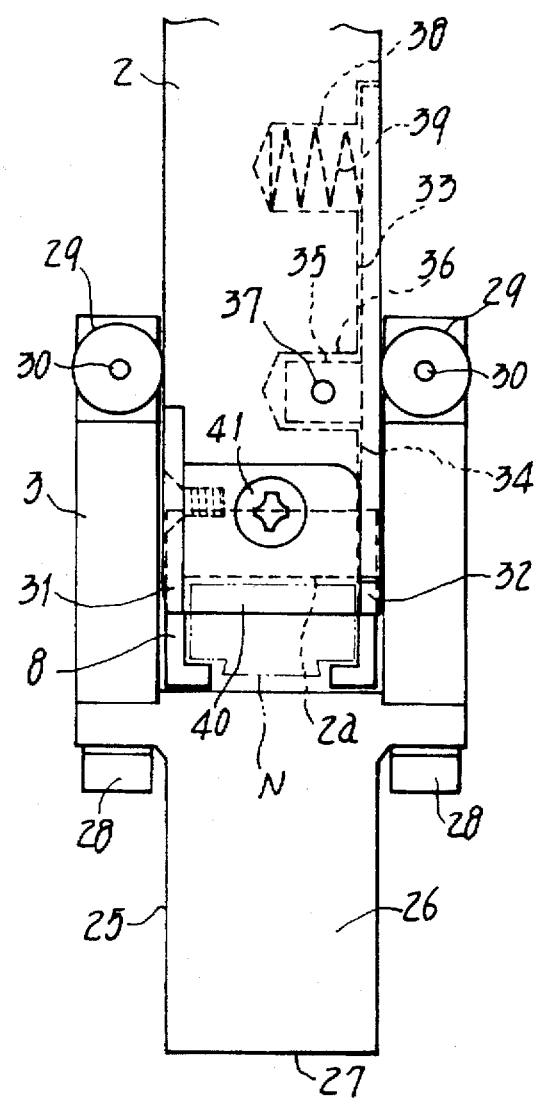
FIG. 2 is a cross section taken along the line 2—2 in FIG. 1.
Figure 3A:
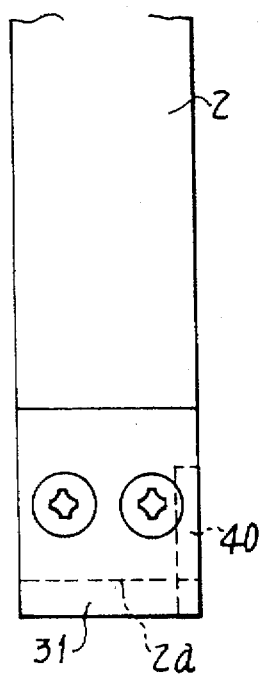
Figure 3B:
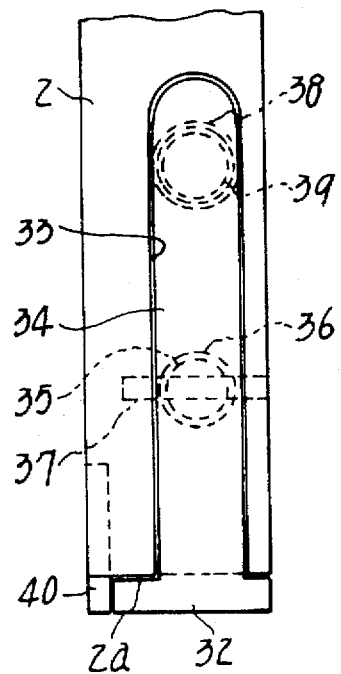
Figure 3C:
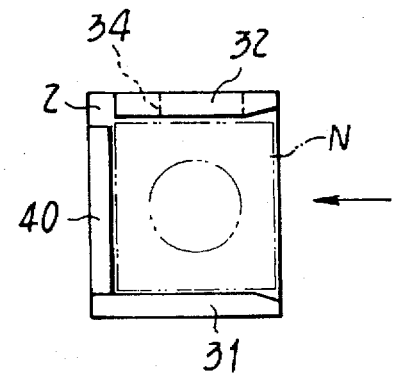

As shown in FIGS. 2 and 3, a pair of gripping fingers 31 and 32 are attached to opposite sides of a lower portion of the punch 2. One of the fingers 31 is fixed to one side of said punch and extends downwards beyond a bottom face 2a thereof. The other finger 32 is a swingable finger integral with a bottom of a rockable base plate 34, which fits in an elongate groove 33 formed in and longitudinally of the other side of the striking punch. A boss 35 protruding from an intermediate portion of the rockable base plate engages with a pit 36 and is pivoted there by a pin 37 to said other side of said punch. The latter finger 32 having also a lower end downwardly protruding out of the bottom face 2a of said punch is urged towards the former finger 31, because a compressed spring 39 received in another pit 38 formed in an upper region of the elongate groove 33 urges outwards the base plate. A stopper 40 for regulating the position of the nut 'N' gripped by the fingers 31 and 32 is fixed to a distal side of the lower portion of the punch 2, and located adjacent to said fingers. The stopper 40 is made of an insulating material such as FRP (viz. fiber-reinforced plastics), ceramics or the like so as not to disturb the function of a nut sensing head 42 detailed below. The stopper 40 fastened by a screw 41 to the striking punch 2 also has a lower end protruding beyond the bottom face 2a of the punch.

The nut sensing head 42, which is a proximity detector embedded in a side cap 43 closing the slide guide 3, judges if the nut 'N' delivered to the vertical bore 2 is at a position proximate the bottom face 2a of the striking punch 2. Upon detection of the nut having approached said bottom face, an electric signal will be transmitted to a controller so as to actuate the press ram 13.

Figure 4:
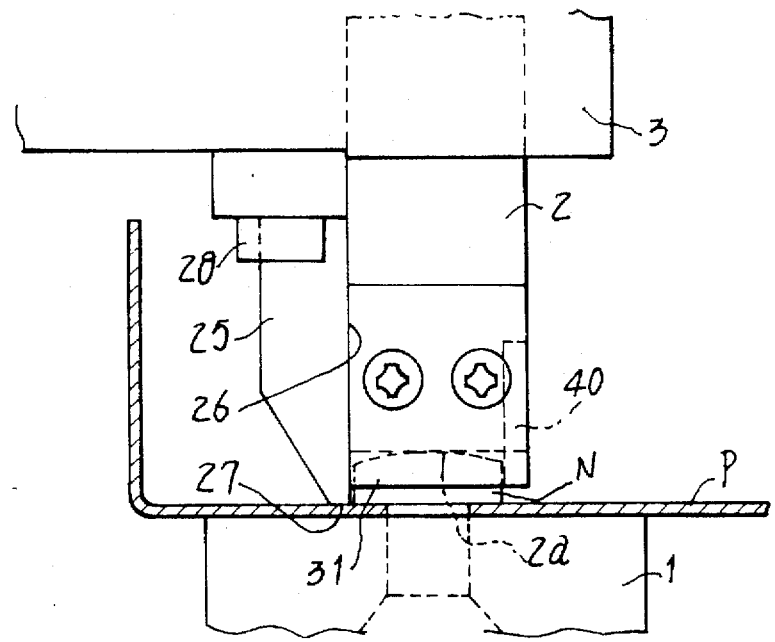
FIG. 4 is an enlarged front elevation of the apparatus in an exemplary use thereof to strike and fix the nut to a metal panel.

In operation as best seen in FIG. 1, as the nut 'N' arrives at the position proximate and below the bottom face 2a of the punch, the fingers 31 and 32 will grip the nut at opposite sides thereof. The stopper 40 will simultaneously regulates the position of this nut relative to the punch. Subsequently, the press ram 13 descends to lower the striking punch 2 and the slide guide 3. The narrow bottom 27 of the workpiece butting leg member 25 will thus bear against the metal panel (viz. workpiece) 'P' and stop. However, the striking punch 2 continues to descend through the vertical bore 4 of the slide guide 3 and along the distal side 26 of the leg member 25, while compressing the coiled spring 18. The distal side 26 will protect the nut 'N', which is gripped by the fingers and descending, from undesirably changing its position. The punch 2 will further descend until the nut 'N' collides with and is secured to the panel 'P' as shown in FIG. 4. When the nut pierces the panel in this manner, a lower face of the nut 'N' will function as a punching die that bites the panel and removes a small piece therefrom to form a round hole. Simultaneously, the caulking die will caulk a periphery around the hole in the panel 'P' to irremovably seize the nut.

Figure 5:
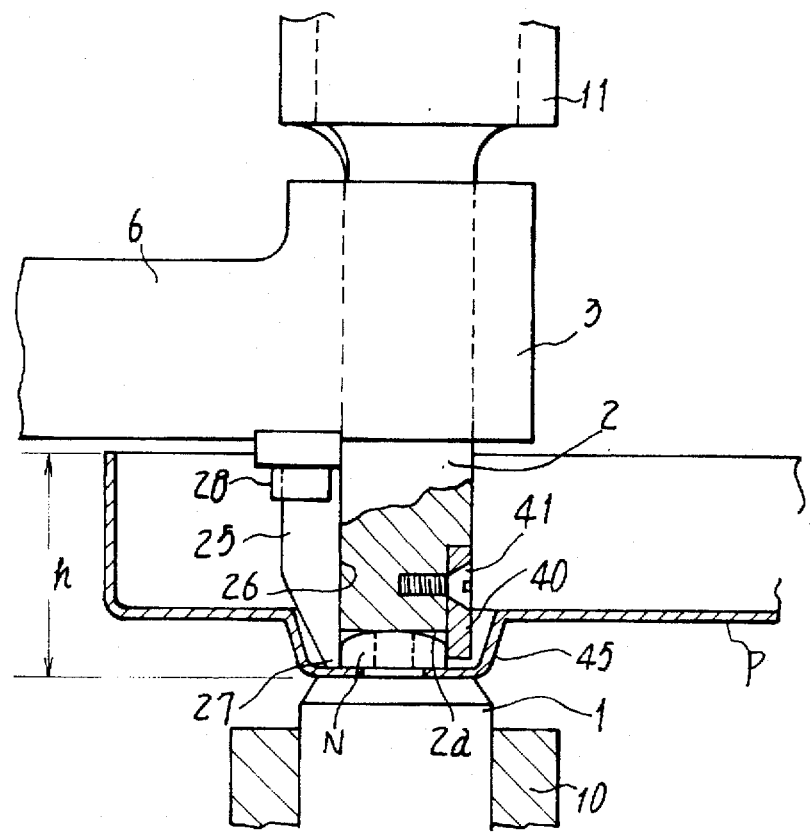
FIG. 5 is a front elevation corresponding to FIG. 4 and illustrating the apparatus in another use and partly in cross section.

Even if the L-shaped panel (viz. workpiece) 'P' having a narrow recess 45 formed therein is concerned, the apparatus can rigidly secure the nut 'N' thereto as shown in FIG. 5, provided that there is a space for receiving the punch 2 and the leg member 25.

In summary, the apparatus for automatically fixing the self-piercing nuts has the mechanism for intermittently feeding same. The movable chute 8 serving as a principal member of this mechanism is swingable within the rigid frame 6 connected to the slide guide 3, and will repeat to take its inoperative position where its distal opening 8a is closed in part with the side face of the striking punch 2 or slide guide 3. Such a structure advantageously renders the apparatus as a whole lighter in weight, smaller in size and easier to remote control.

According to the other feature defined in the claim 2, the movable chute 8 swinging in harmony with vertical reciprocation of the press ram makes it possible to feed the nuts separately one after another into the vertical bore 4 of the slide guide 3. Those nuts are protected from jamming in said bore 4, because only one nut is present within the bore at any moment. The apparatus thus rendered free from the so-called 'double nut pressing' problem can now operate smoothly in order even if it is driven continuously for a long time and at a high speed.

What is claimed is:

1. An apparatus for intermittent feed and automatic fixing of the self-piercing nuts onto a metallic panel, the apparatus comprising:

a caulking die for supporting the metallic panel;

a striking punch connected by a connecting member to a press ram so as to face the caulking die;

a slide guide-having a vertical bore and a nut feeding aperture extending perpendicular thereto;

the striking punch being capable of sliding up and down through the vertical bore;

a flexible chute connected to the slide guide and communicating with the nut feeding aperture;

a supporting device for holding and allowing the slide guide to slide up and down a vertical distance relative to the connecting member;

the supporting device biasing the slide guide downwardly by a spring means such that the self-piercing nut having entered the vertical bore through the feeding aperture is struck by the punch so as to bite or punch and be secured to the metallic panel;

a rigid frame to which the slide guide is fixed;

a movable chute having a distal opening communicating with the feeding aperture and a proximal opening communicating with the flexible chute;

the movable chute being held in and connected to the rigid frame; and an actuator mounted on the rigid frame so as to drive the movable chute to swing between an operative and inoperative positions thereof relative to the slide guide, whereby the distal opening of the movable chute is partially closed with a side face of the striking punch or of the slide guide every time when the movable chute swings to its inoperative position.

2. An apparatus as defined in claim 1, wherein the movable chute is driven to swing in harmony with vertical reciprocation of the press ram driving the striking punch, so that the succeeding nut (N) enters the vertical bore of the slide guide after the preceding nut has left said core.

* * * * *